(No Model.)
H. T. BURT & J. B. BURGESS.
CHURN.
No. 321,339. Patented June 30, 1885.
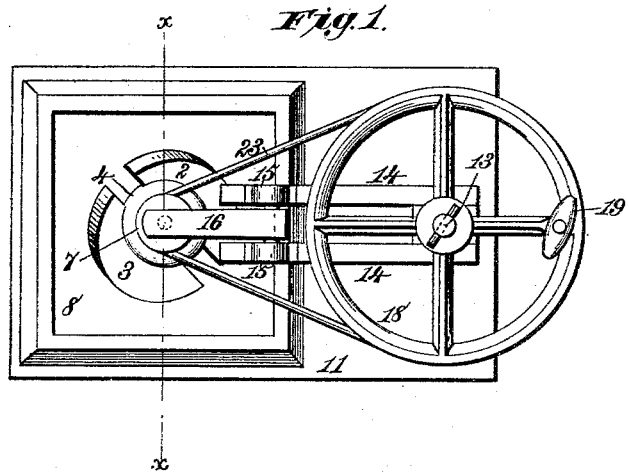
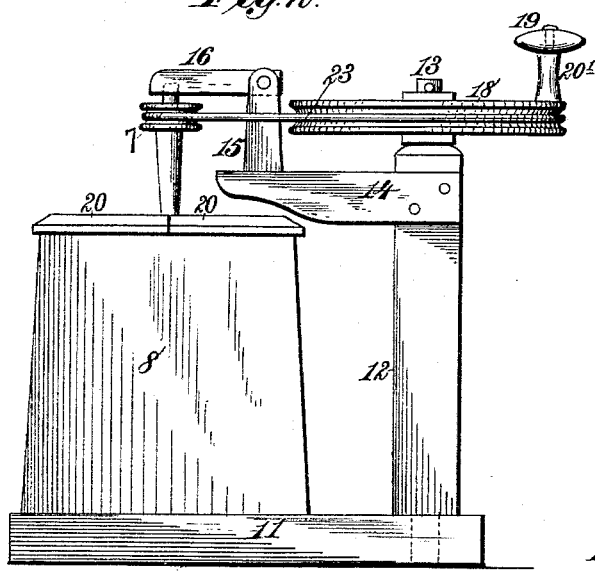
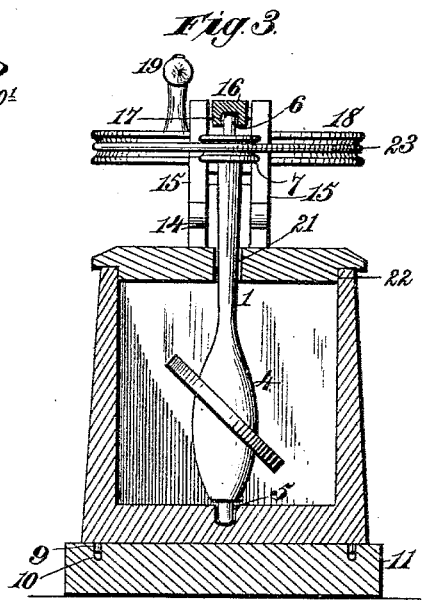
Witnesses.
Robert Errett.
J. A. Rutherford
Inventors.
Haislip T. Burt.
John B. Burgess
By James L. Norris.
Atty.

UNITED STATES PATENT OFFICE.

HAISLIP T. BURT AND JOHN B. BURGESS, OF ARCHER, TENNESSEE.

CHURN.

SPECIFICATION forming part of Letters Patent No. 321,339, dated June 30, 1885.

Application filed March 14, 1885. (No model.)

*To all whom it may concern:*

Be it known that we, HAISLIP TRIBBLE BURT and JOHN BELL BURGESS, citizens of the United States, residing at Archer, in the county of Marshall and State of Tennessee, have invented new and useful Improvements in Churns, of which the following is a specification.

Our invention relates to an improved churn, and the appliances connected therewith, for communicating the proper motion to the dasher thereof; and it consists in the features more particularly hereinafter described and claimed, reference being had to the drawings, in which—

Figure 1 represents a top or plan view of our improved churn with the cover removed; Fig. 2, a side view thereof, and Fig. 3 a section on line $x\,x$, of Fig. 1.

The churn proper or butter-separating part of the device consists of a tank or body, 8, having a square or angular interior in contradistinction to a circular or cylindrical form. This body 8 is supported upon a bed, 11, and is prevented from lateral movement thereon by dowels, spurs, or pins 9, affixed thereto, and taking into corresponding recesses or mortise-holes, 10, in the base 11. It is of course evident that the same effect may be had by reversing this arrangement and placing the dowels, pins, or spurs 9 on the base 11, and the mortises or recesses in the base of the tank 8. Within this square or angular tank is seated, by a journaled end, 5, a dasher consisting of an axis, 1, enlarged toward its base into a bulb, 4, upon which are eccentrically secured the two wings or dasher-blades, 2 3, preferably not joined, so that a space is left between them at their nearest edges. The upper end of this axis 1 is formed into a journal, 6, for the upper bearing thereof, while just below the same a pulley, 7, is made upon or attached to the axis for communicating motion thereto. This body or tank 8 is provided with a cover, preferably made of two halves, 20 20, in the center of which is an aperture, 21, for the passage therethrough of the axis 1 of the dasher, the cover having a shoulder, 22, upon its under side, fitting within the top of the tank or body 8, so as to securely retain the cover in place.

From the base 11 rises an upright standard, 12, whose upper end is formed into an axle, 13, upon which is seated, capable of revolution thereon, the main driving-wheel or pulley 18, provided with pin 20′ and handle 19, pivotally secured thereto. A belt, 23, communicates motion from the driving-pulley 18 to the dasher, and, as the pulley 7 of the latter is much smaller than the main driving-pulley 18, a greatly increased speed of rotation is given the dasher.

Projecting from the standard 12, in the direction of the body or tank 8 and above its top, are the arms 14, which support near their outer ends the arms 15, as shown. Pivoted to these arms is an arm, 16, upon whose under side is made the recess 17, adapted to serve as a journal-box for the journal 6 of the axis 1.

In operation, in order to place the cream or other material to be churned within the tank, the pivoted arm 16 is thrown back toward the standard 12. This permits the removal of the top 20, and, if desired, of the dasher 1 2 3 4. The material being then placed in the tank, the dasher is replaced, properly stepped by its journal 5 in the bottom of the tank, the cover is placed thereupon, and the arm 16 swung forward so that 6 is journaled in 17. The belt being in position upon the pulleys 18 and 7, power is applied to 18 by means of the crank or handle 19. A greatly increased speed of rotation is given the dasher, causing thorough agitation of the contents of the tank. From the rotation of the dasher-wings to the axis, one-half is tending to throw the contents upwardly while the other half is tending to throw them downwardly, this opposition of actions aiding in the agitation. At the same time, the interior of the body being square or angular, the dashers throw the contents into the angular corners, whence, by reaction, they are thrown back upon the dasher-wings, this again aiding in rapid and thorough agitation. In addition, waste of power through a multiplicity of gearings, or gearings with horizontal bearings, is avoided by using two simple gears having vertical bearings only and connected by a simple belt. By this construction we are able to furnish a churn of simple and economical construction, yet durable and efficient.

Having thus described our invention, what we claim is—

1. The combination of a supporting-base, 11, a standard, 12, secured thereto, a horizontal arm, 14, secured to the upper end of the standard, vertical arms 15, secured to the horizontal arm, and an arm, 16, pivoted to the vertical arms, with a churn body or tank on the base, and a dasher-rod having its upper end journaled in the pivoted arm, substantially as described.

2. A churn consisting of a supporting-base, a standard rising therefrom, a horizontal arm secured to the upper portion of the standard, vertical arms secured to the horizontal arm, an arm pivoted to the vertical arms, a driving-wheel mounted in a horizontal position on the standard above the horizontal arm, a churn body or tank on the base, and a dasher-rod having its upper end journaled in the pivoted arm and having an attached horizontal pulley belted to and in the same plane with the driving-wheel, substantially as described.

In testimony whereof we affix our signatures in presence of two witnesses.

HAISLIP T. BURT.
JOHN B. BURGESS.

Witnesses:
W. C. EDWARDS,
T. C. BLACK.